United States Patent [19]
Baer

[11] 3,991,266
[45] Nov. 9, 1976

[54] DUAL IMAGE TELEVISION
[75] Inventor: Ralph H. Baer, Manchester, N.H.
[73] Assignee: Sanders Associates, Inc., Nashua, N.H.
[22] Filed: Sept. 3, 1974
[21] Appl. No.: 503,007

[52] U.S. Cl. .................. 178/5.8 R; 178/DIG. 23
[51] Int. Cl.² .............................. H04N 7/04
[58] Field of Search ........... 178/6.5, 5.6, 5.8 R, 178/7.1, 7.2, DIG. 23; 315/3

[56] References Cited
UNITED STATES PATENTS

| | | | |
|---|---|---|---|
| 2,301,254 | 11/1942 | Carnahan | 178/6.5 |
| 2,769,025 | 10/1956 | Hoffmann et al. | 178/5.1 |
| 3,165,578 | 1/1965 | Lauricella | 178/6.5 X |
| 3,294,898 | 12/1966 | Gold | 178/6.5 UX |
| 3,358,079 | 12/1967 | Banning | 178/6.5 |
| 3,626,404 | 12/1971 | Ophir et al. | 178/6.5 X |
| 3,725,571 | 4/1973 | Justice | 178/DIG. 23 |
| 3,743,767 | 7/1973 | Bitzer et al. | 178/5.6 |
| 3,745,241 | 7/1973 | Hirashima | 178/DIG. 23 |
| 3,745,242 | 7/1973 | Justice | 178/DIG. 23 |
| 3,783,184 | 1/1974 | Ernstoff et al. | 17/5.4 BD |
| 3,821,466 | 6/1974 | Roese | 178/6.5 |
| 3,837,003 | 9/1974 | Justice | 178/DIG. 23 |
| 3,858,001 | 12/1974 | Bonne | 178/6.5 |
| 3,903,358 | 9/1975 | Roese | 178/6.5 |

OTHER PUBLICATIONS

Altman, "The New Concept for Memory and Imaging: Charge Coupling," *Electronics*, June 21, 1971, pp. 50–59.

Primary Examiner—Robert L. Richardson
Attorney, Agent, or Firm—Louis Etlinger; Richard I. Seligman

[57] ABSTRACT

In a television system, a multiplexing system permits the simultaneous transmission of two or more images with apparent full resolution, but without a corresponding increase in required transmission bandwidth. The television transmission uses the method of interleaving successive scan lines from different picture sources, such as two TV cameras, these sources being synchronized by common horizontal and vertical synchronization signals.

1 Claim, 9 Drawing Figures

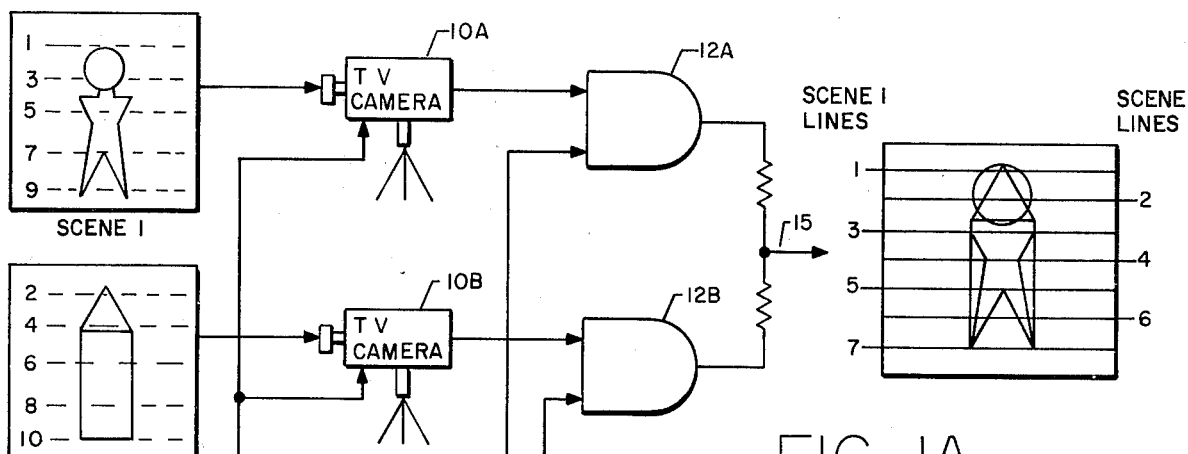
FIG. IA
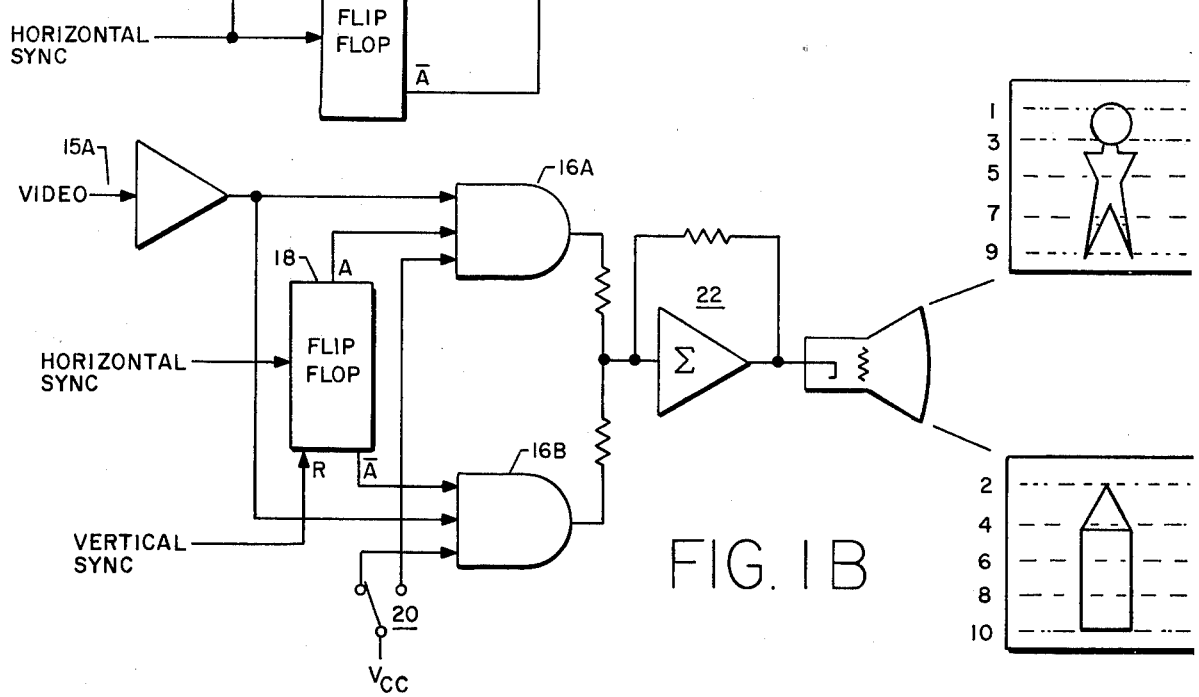
FIG. IB
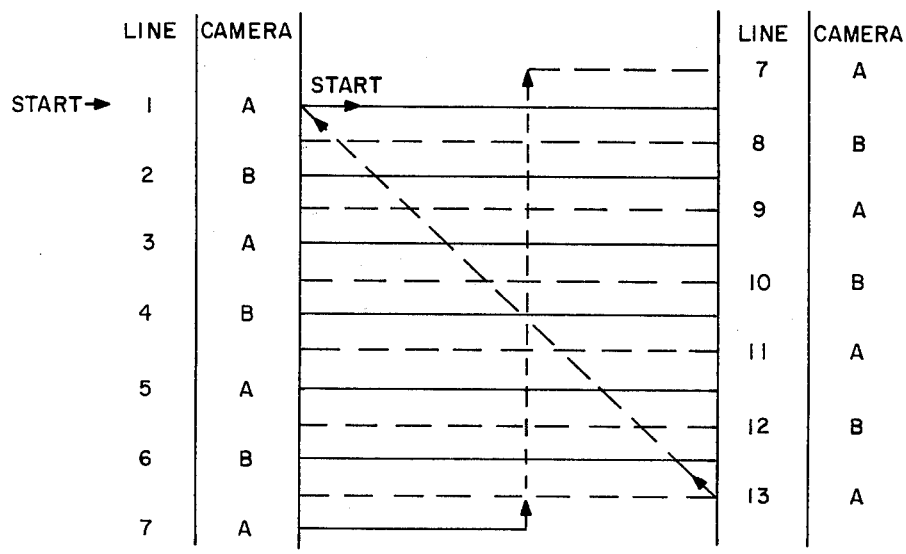
FIG. 2

DUAL IMAGE TELEVISION

BACKGROUND OF THE INVENTION

In certain applications of broadcast television, CATV, and the like it is desirable to present to a viewer simultaneously multiple television presentations for selective viewing. These multiple presentations can be broadcast by conventional broadcast channels or via CATV. Alternatively, it is desirable to record two television programs in real time on a single track of a video tape recording for selective viewing upon playback.

Prior to the present invention this could only be accomplished by assigning the multiple presentations different areas of the television screen and selectively unblanking a particular selected area. This arrangement is not completely satisfactory in that the selected presentation is relatively small in size.

Furthermore, when substantial areas of the screen are blanked and, thus, substantial areas of black or white are presented to the TV receiver, the average level of signal presented to the receiver is appreciably different from a normal signal. This can interfere with the AGC circuitry of both the studio camera and the receiver. This interference can be sufficient to cause display of the information in the blanked areas although at a low level thus defeating the very intent of the dual presentation.

SUMMARY OF THE INVENTION

Accordingly, it is an object of this invention to provide a television entertainment, education and training system which permits a cooperating television station to send multiple images in real time, without bandwidth increases, so as to allow the viewer a manual or automatic choice of two or more, different, programs or other presentations over the same channel.

It is another object of this invention to provide a method of transmitting a sequence of horizontal (video) lines taken alternately from two video sources; and reproducing one or the other picture at the receiving end, by selectively blanking one or the other set of alternate horizontal lines.

It is a further object of this invention to provide a system of the above type in which the "Dual Image" program material is prerecorded, on the same track of a video tape, for TV or CATV transmission, or direct playback by one or more viewers.

It is still another object of this invention to provide for the simultaneous transmission, or recording and playback, of two entirely unrelated programs, such as an entertainment program and a continuous news-wire services presentation.

The basis for this dual-image technique lies in the fact that much video data can be satisfactorily viewed while maintaining full horizontal resolution but only ½-of-normal vertical resolution. Therefore, if a video field is interleaved such that lines 1, 3, 5, 7 . . . 255 represent one image, and lines 2, 4, 6, 8 . . . 256 represent a second image, then selectively unblanking either all even or all odd numbered horizontal lines results in displaying only one image or the other, albeit with half the normal number of horizontal scan lines and, therefore, with one-half the normal vertical resolution. Since many monitors and TV sets do not interlace properly in currently available equipment and hence yield only about ½ of expected vertical resolution without being unacceptable to most viewers, this method of dual-image transmission sacrifices little, if anything.

At the receiving end, the desired set of alternate scan lines is displayed by blanking the undesired set. Reference to vertical synchronization signals establishes the starting point for this selective unblanking action. When needed, vertical resolution can be fully restored by a particular sequence of switching between the two cameras on a field by field basis. In a standard 2:1 interlaced system, this sequence simply requires reversal of the Camera A, Camera B, Camera A, Camera B . . . sequence, to the inverse Camera B – Camera A once every other frame. Homogeneity of each of the dual images can also be improved by video storage and grey level substitution.

In this fashion, multiple TV presentations can be broadcast on one TV channel for selective viewing; or alternately, two TV programs can be recorded in real time on a single track of a video tape recording for selective viewing upon playback.

Briefly, the present invention comprises the transmission or recording and play back of "dual images" without requiring video bandwidth increases, in a manner making it virtually undetectable to the viewer. The switching rates used are high enough to eliminate all possibility of flicker perception, since they are of the order of one-half the horizontal sweep rate. This is unlike earlier attempts to utilize field-by-field or frame-by-frame switching to convey multiple image data for stereo presentations.

In the present invention, if no further precaution is taken, simply switching back and forth between two video sources, say two cameras, results in a reduction of vertical resolution. While this may not be objectionable in many applications, the invention contemplates methods for improving the apparent and real quality, respectively, of the displayed image. One method requires injecting at the receiver a video grey level somewhere between black and white into the unused lines instead of leaving them black. This level may be representative of the average grey level of the preceding line, thus blending the blank line into the total image in a more pleasing way.

Another method involves, reversing the order in which the two video sources are commutated; specifically, in a two-to-one interlaced TV system, this switching sequence is reversed once every frame. Analysis shows that this restores essentially all vertical resolution; the only difference between play-back of a standard TV image and a dual-image being a slight (3db) reduction in effective contrast. The latter can be compensated for by raising the contrast adjustments for the original scene.

An example of use for such a system is in the education field, where it is often desirable not only to teach through preprogrammed, video taped presentations by presenting an instructor, but to allow the student to relate interactively with the taped presentation. One method of interaction is the interjection of multiple choice quizzes at appropriate points in the program presentation. The student interacts by making a choice based on his level of learning. As a result, indicators light up or selective unblanking of the screen reveals prerecorded messages to the student, thus giving him a response directly related to his answer.

A preferred method makes use of the present invention in that it allows the student's response to a quizz question to result in either one of two, or more, full screen TV presentation. Thus, the student answering a quizz question correctly might see the instructor back on-screen, going into a new or advanced subject related to the quizz material. Alternately, an incorrect answer might have brought an instructor on-screen going through a review of the quizz material. In this fashion, personalized, responsive TV training can be accomplished.

As an additional example of an application making use of the invention, assume that a TV entertainment program presents a quiz show in which a viewer can participate. Depending on his choice of answer, the program effectively responds by presenting one of two or more full screen presentations. If there are N number of sequences between quizzes, the viewer's answers results in up to $2^N$ combinations of sequences. If properly done, this can result in a great variety of entertaining effects.

Also, it is entirely practical to transmit two simultaneous TV presentations in accordance with the present invention, in which one is the standard TV program and the second set of images is that of a completely unrelated program. For example, a motion picture may be in process on Channel A, while Channel B carries continuous 24 hour per day news, weather, stock market and other public service messages. At the viewer's option, he can switch back and forth between these; or if need be, automatic equipment can extract the non-viewed information electronically, while Channel A picture is being watched. The transmission of large quantities of digital data using the concept of the present invention is also clearly practical. Such data could operate "off line" printers, calculators, computers and other devices, all without requiring additional bandwidth for the transmission of the Dual Image video data.

Another example of the use of the present invention is its application to Pay-TV systems, either in a hotel, motel or CATV system. Dual image programs can be used in this connection to double the program-handling capability of the Pay-TV system for a given set of available equipments, such as video tape players.

A feature of the present invention concerns its ability to transmit video scenes which appear only as grey levels without information content, without visible flicker problem and need for circuitry beyond that already needed for basic dual-image techniques described in this application. The utility of such a system is its ability to withhold full or partial-screen display of program material from the viewer whenever required. For example, in a multiple choice quiz, lack of participation by the student/viewer should preclude his seeing the various responses which appear on screen shortly after the time allotted for the student's replies to the quiz question. If he were allowed to see these, he could "defeat" his video teaching system by "watching the answers" as they come onto the screen. The present invention can prevent this by using the ability of the dual image circuits to switch back and forth between a video (picture) signal and its polarity-inverted dual on a line-by-line basis. The effect of viewing a picture composed of alternate lines of video signals and their duals (reciprocals) is visual cancellation. Now, if the student responds to the question with an answer, some portion of the scan lines carrying inverted information is logically commanded to be gated "off", thus preventing visual cancellation over that portion of the screen and, subsequently, exposing the "message" there presented.

Finally, an application of the present invention is its use as a method for producing stereo TV images. If alternate dual image frames are used to display the left and right camera views of a stereo transmission, then alternate lines contains stereo pair information. Using electro-optically switched goggles, such as PLZT opto-ceramics in alternate "lenses" which are driven at one-half line rates, the viewer will perceive a flicker-free stereo image.

BRIEF DESCRIPTION OF THE DRAWINGS

The above-mentioned and other features of this invention will become more apparent by reference to the following description taken in conjunction with the accompanying drawings, in which:

FIG. 1A is a block diagram of a system for generating dual images on separate fields within a single frame;

FIG. 1B is a block diagram of a system for displaying the dual images generated by the system of FIG. 1A;

FIG. 2 is a sketch illustrating the principles of the dual image system;

DESCRIPTION OF THE PREFERRED EMBODIMENT

Figure 3:
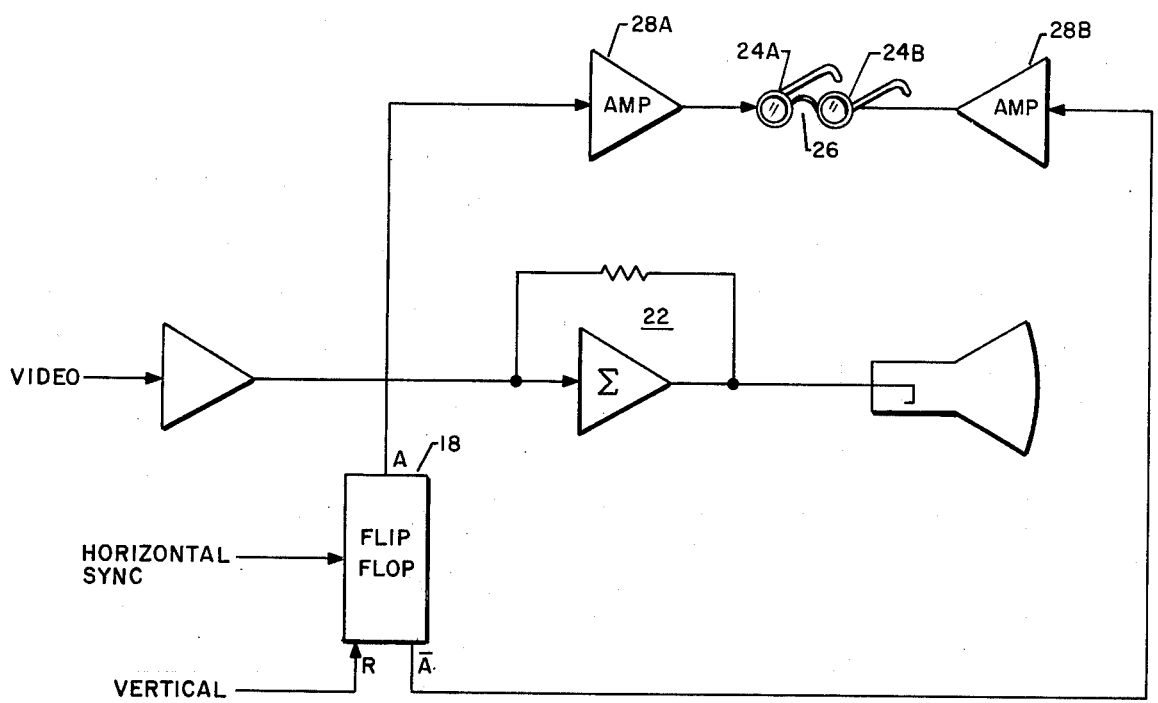
FIG. 3 is a block diagram of a system for displaying stereo images.

Refer now to FIGS. 1A and 1B of the drawings. A Dual-Image transmission system is seen in FIG. 1A. For clarity, the modulators and other parts of the transmission system which are well known have been omitted. Two cameras 10A and 10B feed two linear gate circuits 12A and 12B which are, for example, FET's. Simultaneously, horizontal synchronization signals are applied to both cameras 10A and 10B and to a flip-flop divide-by-two circuit 14 which is reset by vertical synchronization signals. Applying the output of flip-flop 14 to the two gates 12A and 12B results in video output at sum-point 15 consisting of alternate horizontal scan lines from cameras 10A and 10B. Reference to FIG. 1B shows how these interleaved dual-images are selectively extracted at the receiving end. Again for simplicity the portion of the receiver which is well known has been omitted for clarity. Note also that point 15 in FIG. 1A and point 15A in FIG. 1B might be connected directly in a studio monitor and camera installation, or linked by a video recording and playback system. Video 15A is again applied to two linear gates 16A and 16B which are also driven by common horizontal synchronization signals via a divide-by-two flip-flop 18. In addition, a selector switch 20 enables either gate 16A or 16B; therefore, whenever both the flip-flop 18 and switch selector 20 cause gate 16A to be "ON", alternate horizontal video lines will be allowed to pass to a sum amplifier 22. Similarly, if selector switch 20 is in the other position, gate 16B will pass the other set of alternate horizontal lines on to sum amplifier 22.

Hence, switch 20 permits selection of either one of the two simultaneously transmitted pictures, thus reproducing the image picked up by either camera 10A or 10B. Vertical synchronization signals are applied to the reset input of flip-flop 18 to definitize the positions of switch 20, i.e. to start the sequence with the correct camera signal.

If in FIG. 1A camera 10B is eliminated and the input to gate 12B is taken instead from camera 10A after passing through an invertor then the signal display on the CRT will appear as grey levels without pictorial contents assuming all of it is passed to the CRT. Thus, in FIG. 1B both gates 16A and 16B must be enabled or eliminated. Preferably, one gate 16A, that representing the positive signal, would be eliminated and to display the pictoral content the gate 16B would be disabled.

It can readily be seen from FIGS. 1A and 1B that the dual image system described above can be effectively used to transmit two images simultaneously, and selectively reproduce either one or the other image at the receiving end.

In the system described in connection with FIGS. 1A and 1B, only onehalf the normal number of horizontal lines are available for each of the dual images transmitted in the simple, interleaved camera 10A, 10B, 10A, 10B, 10A . . . sequence.

Referring now to FIG. 2, a simplified diagram showing this sequence is set forth. Starting with line 1 = camera 10A, this is followed by line 2 = camera 10B, and so on as seen in the figure. Such an interlaced TV system is characterized by an odd-number relationship of horizontal lines per frame. In the case of U.S. television, this ratio is 525:1. In FIG. 2, this relationship is 13:1 for the sake of simplifying the example. FIG. 2 shows that selection of Camera 10A picture by the viewer will provide his TV set, monitor, or other display with video modulation for lines 1, 3, 5, 7, 9, 11 and 13. Notice, however, that for the duration of two interlaced fields (= one frame), lines 2 and 8, 4 and 10, 6 and 12 are line pairs of Camera B video; whereas lines 3 and 9, 5 and 11, 13 and one half of 7, and the other half of 7 and 1 are line pairs of camera 10A.

Thus, it is seen that selection of camera 10A results essentially in an apparent display of two normal horizontal line pairs followed by two unmodulated lines, etc., once per frame. Although the resultant picture would appear to have a coarse vertical resolution, in actual practice the effect is remarkably less objectionable than might have been expected. Therefore, the system of FIGS. 1A and 1B as described above with the aid of FIG. 2, results in an entirely useful dual image transmission and reception system.

Reference to FIG. 2 shows clearly that changing the order, or sequence, in which cameras 10A and 10B are switched, will affect the line pairing shown in FIG. 2. Specifically, if this order is reversed after completion of each frame (line 13 in FIG. 2) so that the new frame starts with line 1 = camera 10B, the previously "blank", unmodulated horizontal lines now carry new video information. Hence this change in sequence on a one-per-frame basis results in restoring modulation to all lines of each dual-image presentation. The remaining differences, which account for the system's ability to transmit two interleaved pictures within normal bandwidth, is the small reduction in contrast resultant from the fact that horizontal lines are shown at an equivalent vertical rate of 15 per second per frame, instead of the "normal" 30 per second per frame. However, the system shown in FIGS. 1A, 1B and 2 do not contain subjective flicker components and can, therefore, be viewed with complete comfort.

Again referring to FIGS. 1A and 1B, it can be seen that placing cameras 10A and 10B side-by-side, so as to duplicate the average human interocular distance or some larger baseline dimension, results in a set of stereo pairs. Applying dual image techniques of FIGS. 1A and 1B, the viewer now has available to him, in a single real time transmission, or recording, this pair of stereo images providing a 3-D effect. FIG. 3 shows how the appropriate images are directed to the viewer's left and right eyes. Electrooptical switches 24A and 24B are switched at horizontal (retrace) rates (in about 5 $\mu$ seconds) by the same output signals A and $\overline{A}$ of flip-flop 18 in FIG. 1B. The electro-optics switches in the viewer's spectacles 26 uses these signals, after amplification in amplifiers 28A and 28B to several hundred volts peak-to-peak for typical PLZT opto-ceramics (lanthanum-modified lead zirconate-lead, titanate material) to synchronously allow alternate light transmission and blocking for each eye, thus recreating the stereo image.

Figure 4:
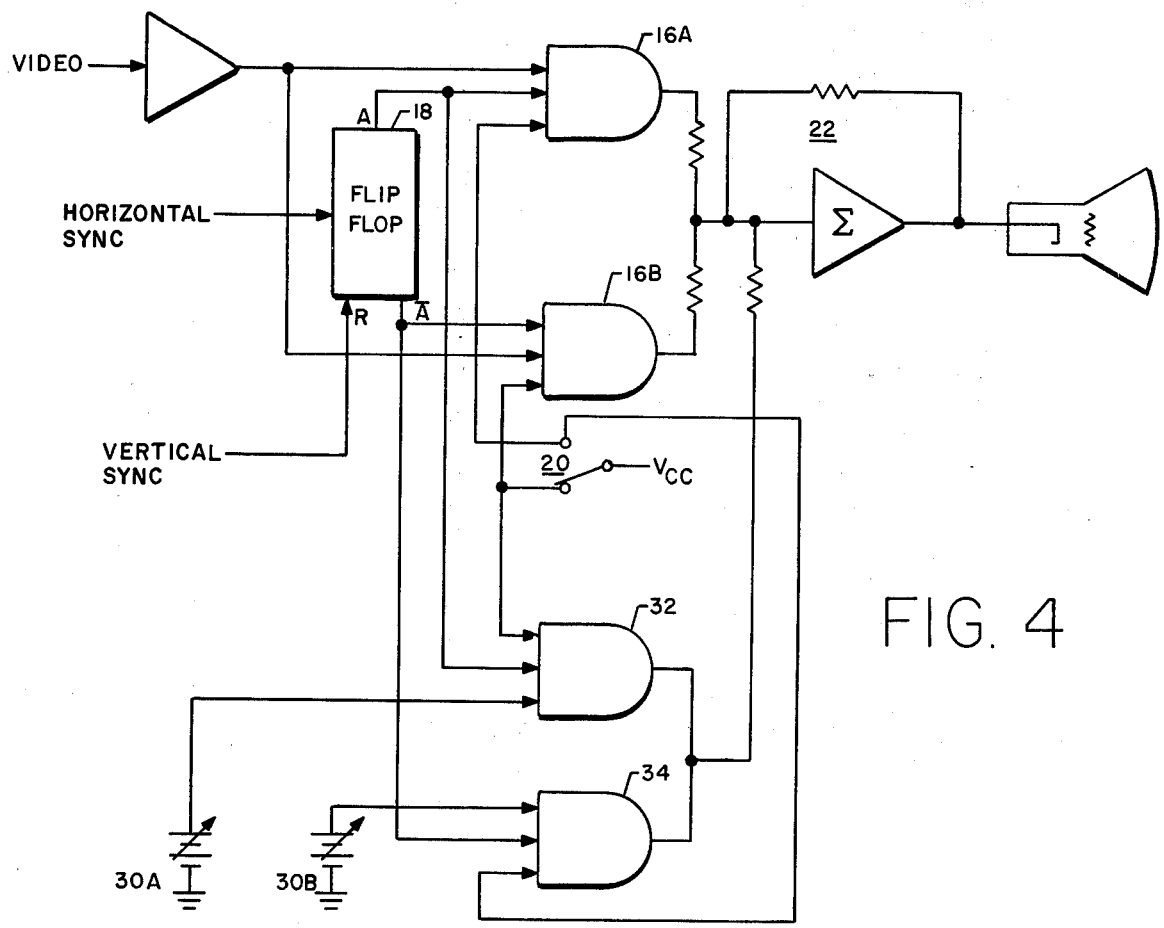
FIG. 4 is a block diagram of a system which improves the presentation displayed by the system of FIG. 1B.

Practical systems of dual image transmission and/or recording and selective playback illustrated and detailed by FIGS. 1 and 2 derive improved performance capability from the substitution of a variable grey-leveled modulation for the blank, black, unmodulated line pairs described in connection with FIG. 2. This grey level is introduced at the receiving end. It may be an arbitrary dc voltage corresponding to a grey level adjusted for the subjectively most pleasant display. Or alternatively it may be derived in the manner of an automatic gain control voltage and insert a grey level roughly consonant with the average grey content of the pictorial area of which the line is a part. This could be done by rectifying the video signal and filtering it with a time constant of a few horizontal lines. One system for introducing the grey level is shown in FIG. 4.

This system is like that of FIG. 1B with the addition of variable voltage sources 30A and 30B representing voltages equivalent to desired grey values. These voltages are applied via a pair of linear gates 32 and 34 to the summing amplifier 22 such that the blanked lines will be "filled in" by a "grey" content. The gates 16A and 16B are enabled by an output from switch 20 to provide which of the alternate horizontal lines are applied to the sum amplifier 22 and thus, which of the two images is to be displayed. The gates 32 and 34 which are also enabled by an output from switch 20 determine which source, 30A or 30B, will supply the grey level signal for the particular displayed image. Since one image may be heavy in whites, one grey level may be preferred while another image heavy in black would prefer a different grey level.

Figure 5:
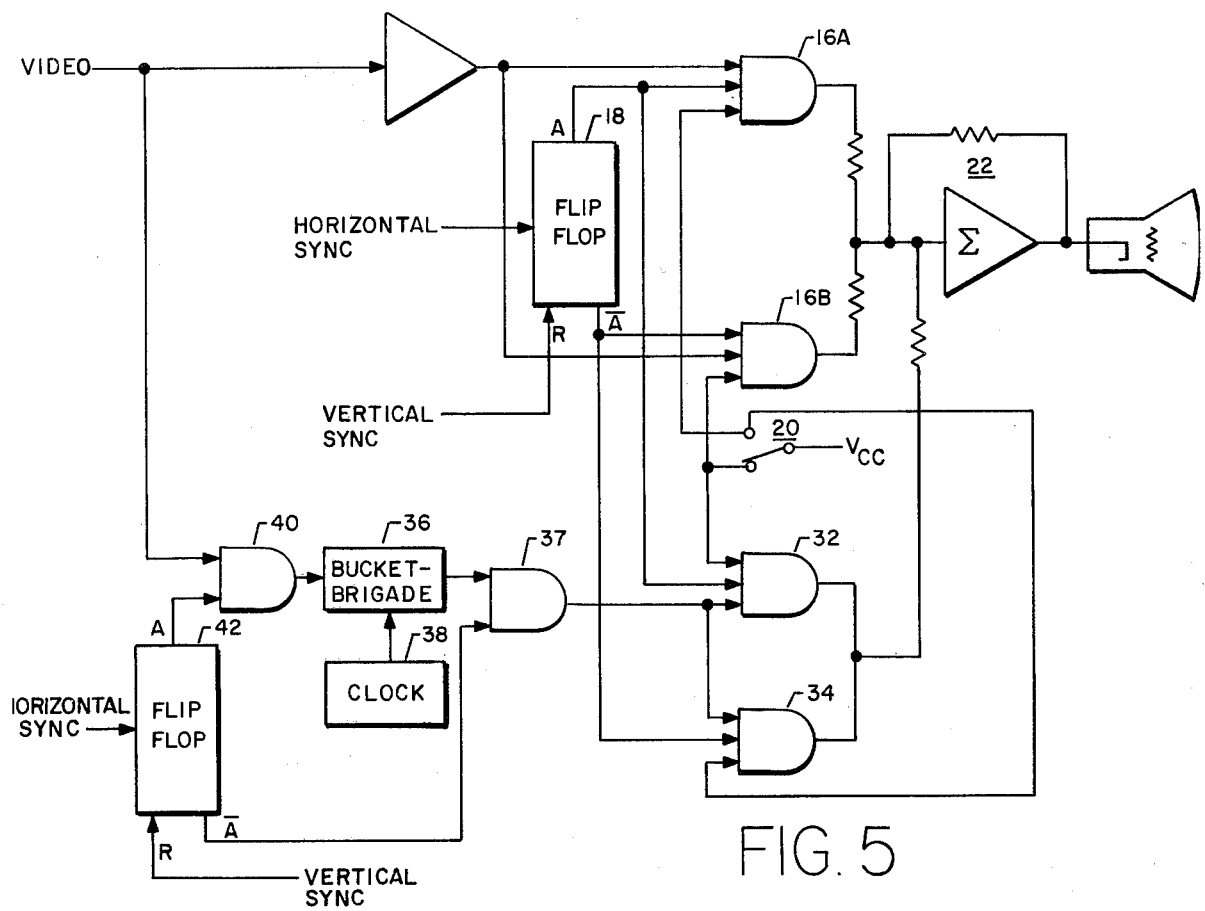
FIG. 5 is a block diagram of a system which further improves the presentation displayed by the system of FIG. 1B.

A still superior method is made possible by the availability of so-called bucket-brigade, or MOS analogue shift register LSI devices. These components can be used as temporary video signal storage. A 400–500 element array can have a video signal clocked into it at a rate of 400 or 500 times active horizontal scan rate (or 59 $\mu$ sec/400 = 148 nanoseconds for U.S. TV). Using this method, a video line being shown in a dual image field can be "recorded", i.e., stored, and then clocked out during the next line interval, which would normally be blank, black or grey. Consequently, a still better depth of contrast results, using this relatively simple and potentially inexpensive technique. This is shown in FIG. 5 wherein a bucket-brigade 36 clocked by a clock 38 stores the video to be written onto the screen during blank line intervals. The video is applied to the bucket-brigade 36 via a linear gate 40 which is enabled by a flip-flop 42 and clocked-out of bucket brigade 35 by a linear gate 37.

This technique can also be used to scramble a TV, CATV or tape presentation. Recording (storing) successive lines in a series of MOS bucket brigades, and playing them in some deliberately scrambled sequence, will make the received picture unviewable unless local storage and corrective sequencing is accomplished.

Figure 6A:
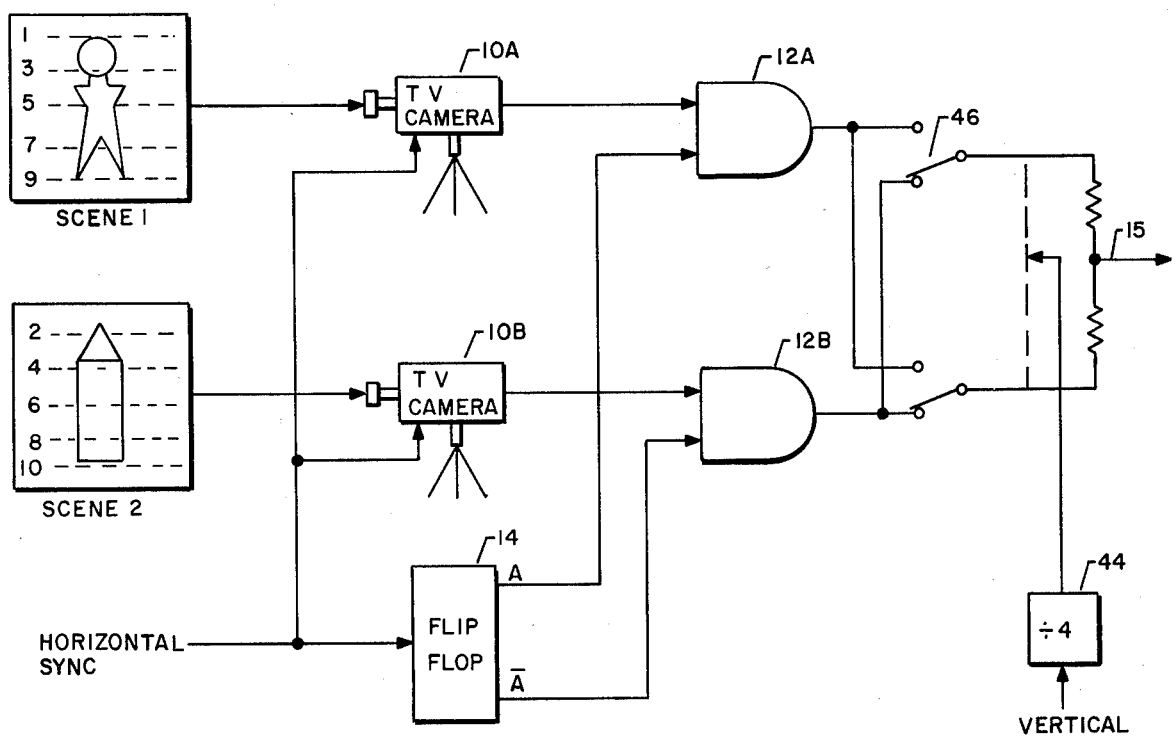
FIGS. 6A and 6B are block diagrams of another system which improves the presentation displayed by the system of FIG. 1B.
Figure 6B:
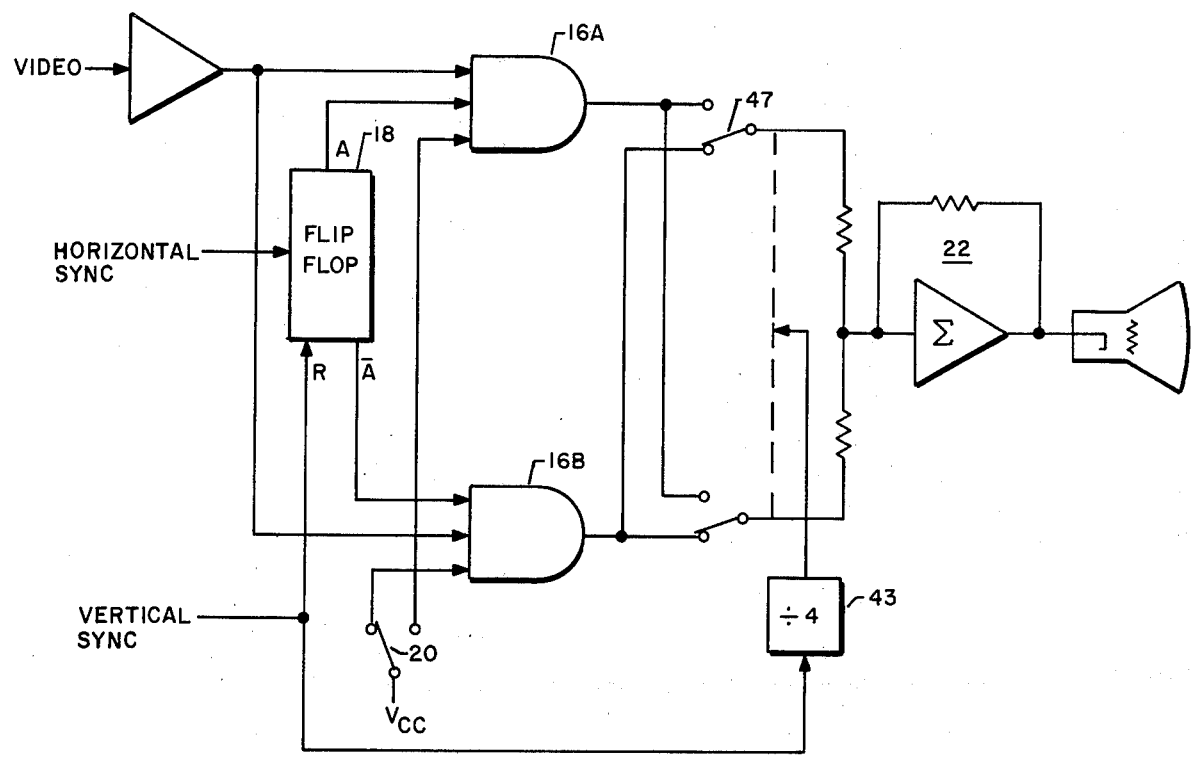

Another method which fully restores the vertical resolution achievable in a standard 2 to 1 interlaced TV system is shown in FIGS. 6A and 6B, modified drawings of FIGS. 1A and 1B. In FIG. 6A a divide by four circuit 44 is shown driven by vertical sync. Divide by four circuit 44 (which can be two flip-flops) reverses output states at frame rates, i.e., its output is "high" during one entire frame and "low" during the next frame. If this output is caused to activate a double-pole double-throw switch 46 such as a relay or FET, then the relationship between particular raster lines and cameras is inverted (reversed) every other frame. This simple mechanism now can be seen to "fill in" missing line-pairs of information at a half-frame rate (15 Hz. U.S. TV system). A flicker free image is possible using this system without further circuitry demands upon the receiver beyond those shown in FIG. 6B wherein a switch 47 and divide by four circuit 43 is added to the circuit of FIG. 1B. These components correspond to switches 44 and divide by four circuit 44 of FIG. 6A.

Figure 7:
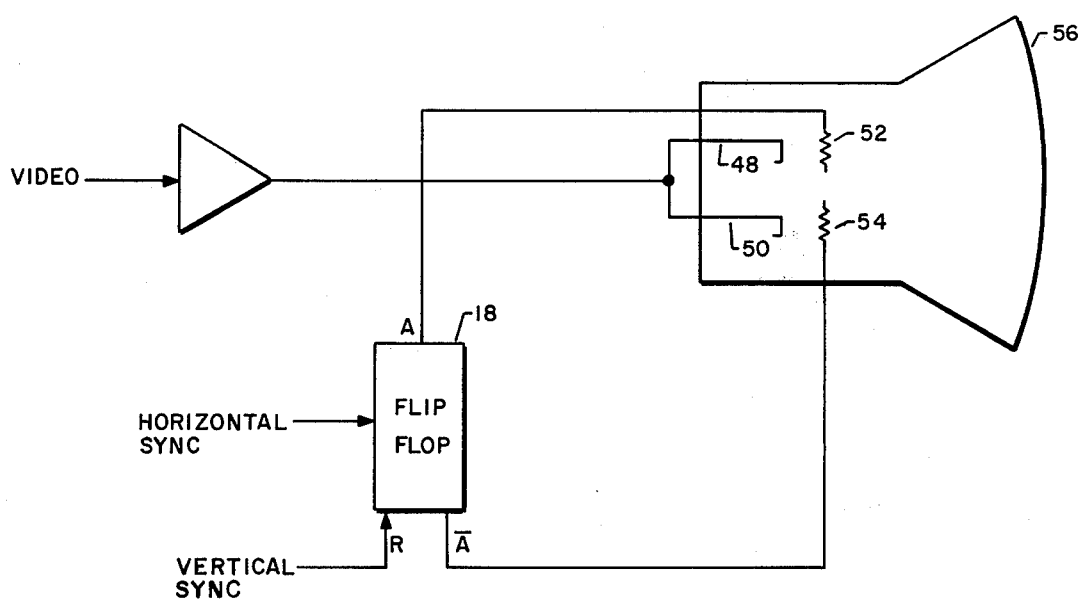
FIG. 7 is a block diagram of another system for displaying 3-D television presentations.

Again referring to stereo viewing as detailed in FIG. 3, a simplified form of quasi-3D can be accomplished by using two cameras spaced as described above. However, camera 10A picks up its image through a first colored filter, while camera 10B has a second colored filter. Preferably, the filters are red and green. At the receiving end, shown in FIG. 7, signals A and $\overline{A}$ of flip-flop 18 are applied to the grids 52 and 54 of the red and green guns of the CRT 56 to turn these guns on, in such a way as to produce green and red dual images. The video is applied to the cathodes 48 and 50 of the guns. No blanking is applied to the alternating sets of red and green lines, but the viewer is equipped with an inexpensive pair of glasses having differently colored lenses, for example, one red and one green lens. As a result the viewer's left eye receives predominately the video information taken by camera 10A and his right eye sees mostly camera 10B imagery. This recreates the sensation of three-dimensional images in the viewers mind. Improved color rendition can be obtained by using two sets of optical filters, at the transmitting and viewing end, which more closely approximate a bandwidth of 4000 to 5500 A for one eye, and 5500 to 6700 A for the other eye.

Further with reference to FIGS. 1A and 1B, it can be seen that other data sources may be substituted for cameras 10A, 10B or both. Thus, application of a digital bit stream to gate 12A in place of video information from camera 10A, allows the interleaved transmission of both types of program material. Similarly, a tape playback unit may be used as a source in FIG. 1A in place of one or both cameras, the only restraint being, of course, that such input source data be in synchronized raster-scan timing order.

Using the dual image technique, then, a large variety of novel and useful entertainment and educational applications to standard TV, CATV and video tape recording systems are seen to exist. Furthermore, the hardware required at the receiver or monitor, as well as the program origination location, is relatively simple and low in cost.

Throughout this specification the dual image technique has been shown for display on the entire screen of a CRT, however, the same techniques are applicable for display of information on selected areas of the screen less than the entire screen as well known in the art. Thus, it is to be understood that the embodiments shown are to be regarded as illustrative only, and that many variations and modifications may be made without departing from the principles of the invention herein disclosed and defined by the appended claims.

I claim:

1. In a raster scan system, apparatus for displaying on a cathode ray tube a single image from a composite signal having information from at least two images therein on different horizontal scan lines, comprising:
    at least one source of electrical signals representing a desired grey level;
    means for providing horizontal synchronization signals;
    means coupled to said means for providing horizontal synchronization signals for coupling the composite signal to the cathode ray tube only during scan periods following predetermined ones of said horizontal synchronization signals; and
    means for coupling said electrical signals to said cathode ray tube during other than said predetermined ones of said horizontal synchronizing signals.

* * * * *